Figure 1:
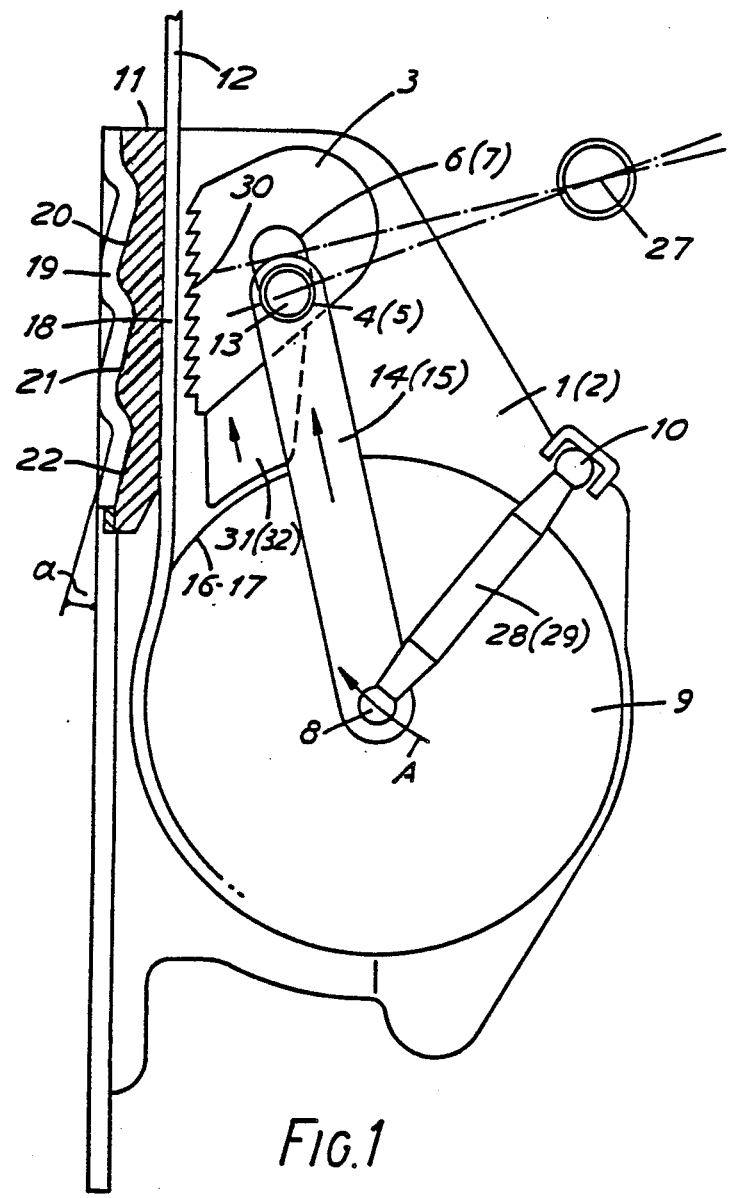

United States Patent [19]

Meyer et al.

[11] Patent Number: 4,899,949
[45] Date of Patent: Feb. 13, 1990

[54] AUTOMATIC SAFETY-BELT REELING DEVICE

[75] Inventors: Rudolph Meyer, Odelzhausen; Martin Specht, Munich, both of Fed. Rep. of Germany

[73] Assignee: BSRD Limited, Carlisle, United Kingdom

[21] Appl. No.: 278,909

[22] Filed: Dec. 2, 1988

[30] Foreign Application Priority Data

Dec. 2, 1987 [DE] Fed. Rep. of Germany ....... 3740796

[51] Int. Cl.⁴ .......................... B60R 22/40; B60R 22/42
[52] U.S. Cl. ........................... 242/107.2; 242/107.4 C; 242/107.4 A
[58] Field of Search ....................... 242/107.2, 107.4 C, 242/107.4 A, 107.4 B; 280/806, 807, 808; 297/478, 479, 480

[56] References Cited

U.S. PATENT DOCUMENTS

| | | | |
|---|---|---|---|
| 3,467,337 | 9/1969 | Putman | 242/107.4 C X |
| 4,394,034 | 7/1983 | Murphy et al. | 242/107.2 X |
| 4,522,350 | 6/1985 | Ernst | 242/107.4 C X |
| 4,597,545 | 7/1986 | Burghardt | 242/107.4 C X |
| 4,667,894 | 5/1987 | Izuchi et al. | 242/107.2 X |
| 4,773,613 | 9/1988 | Kawai et al. | 242/107.2 |
| 4,834,313 | 5/1989 | Tsukamoto | 242/107.4 C |

FOREIGN PATENT DOCUMENTS

| | | |
|---|---|---|
| 0092407 | 4/1983 | European Pat. Off. . |
| 0185367 | 12/1985 | European Pat. Off. . |
| 0273584 | 11/1987 | European Pat. Off. . |
| 0288171 | 3/1988 | European Pat. Off. . |
| 3417877 | 5/1984 | Fed. Rep. of Germany . |
| 3539280 | 5/1987 | Fed. Rep. of Germany ... 242/107.2 |

Primary Examiner—John M. Jillions

[57] ABSTRACT

An automatic passenger seat safety belt reeling device, has a steel frame (31, 32, 33) and a reel rotatable in the frame about an axis (39) which is angularly moveable about a second axis (40) offset from the first axis to effect locking of the belt, the first axis being coupled by connecting links (48) to a pivot (46) of a clamping member (47), the clamping member being thereby moveable with the angular movement of the axis (46) of the reel about yet a further axis (45) displaced from the pivot (46), the clamping member having a curved clamping surface (47a) which thereby moves towards a paying-out seat belt (61) to lockingly clamp it against a clamping plate (50) located in the frame.

8 Claims, 7 Drawing Sheets

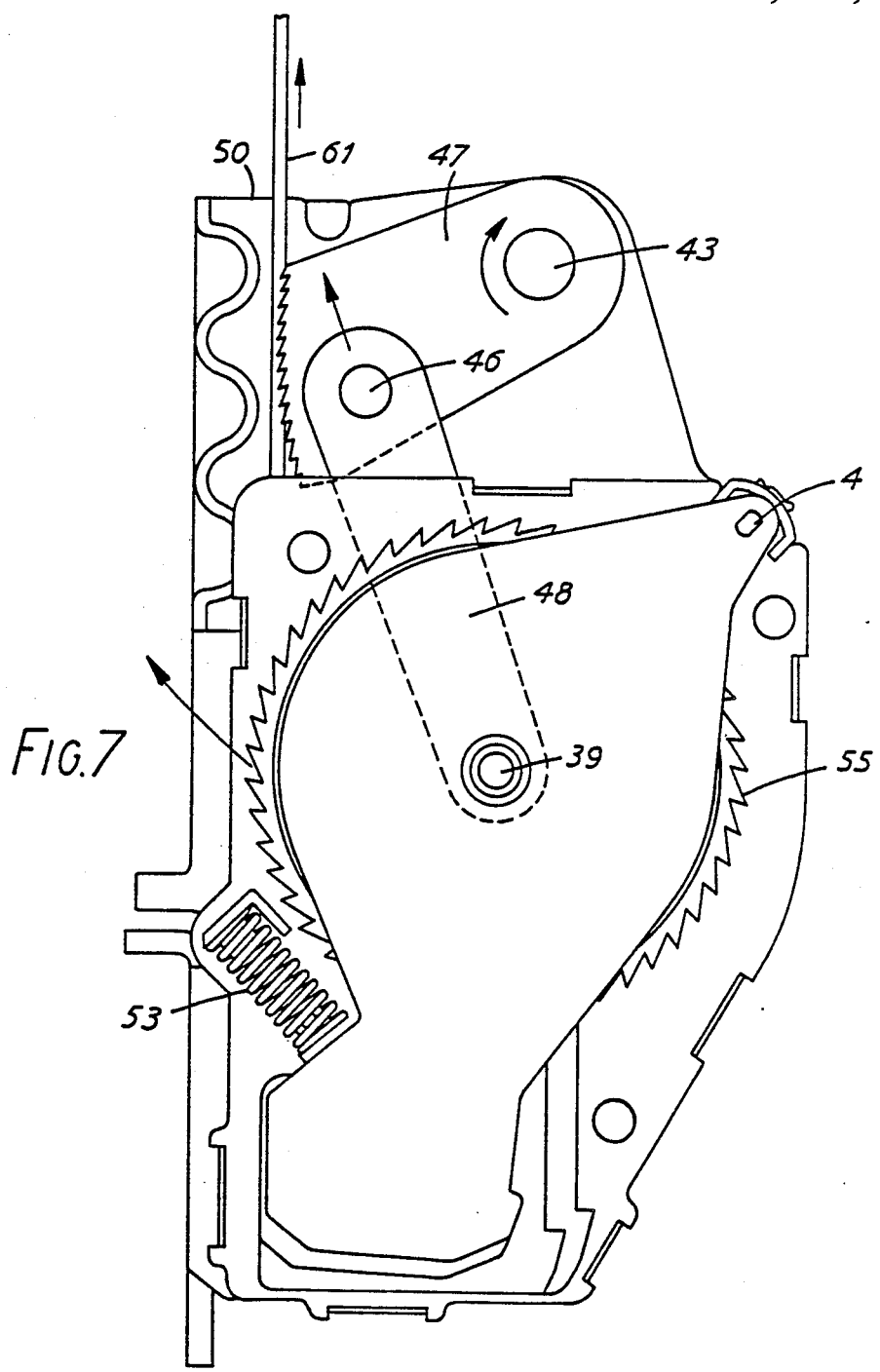

AUTOMATIC SAFETY-BELT REELING DEVICE

The invention relates to an automatic safety-belt reeling device more especially a device having a frame having a back and two side parts within which a belt reel is carried rotatable about a first axis and being effective to permit pay-our or reel-in of the belt, a multifunction sensor mechanism operable to effect locking of the reel rotation during pay-out from said reel between said side parts of said frame and said first axis being displaceable about a second axis parallel thereto to initiate locking of the belt.

An automatic safety-belt reeling device which is known for example from DE 37 18 877 A1, has a clamping member which is arranged on the frame to swivel towards a counterclamping surface in the frame, the blocking mechanism and the sensor mechanism executing a linear lifting movement.

In a further automatic safety-belt reeling device known from EP 0185 367 A2, a clamping action is effected by a one-sided lifting action, about a point of rotation, of the reel axis.

In each of the prior arrangements the device is relatively frictional and the present invention seeks to provide an improved automatic safety-belt reeling device, of simple construction whilst providing rigidity of operation and synchronised actuation of a clamping member with low friction and accurate symmetry of operation.

In accordance with the present invention there is provided an automatic safety belt reeling device having a frame with a back and two side parts within which a belt reel is carried rotatable about a first axis, rotation about said axis being effective to permit pay-out or reel-in of the belt, a multi-function sensor mechanism operable to effect blocking of the reel rotation during pay-out from said reel between said side parts of said frame, said first axis being displaceable about a second axis parallel thereto to initiate locking of the belt characterised in that for said locking of the belt there is provided a moveable belt clamping member guided for movement in the frame about a third axis parallel to the first axis, said clamping member having a first clamping surface and said belt passing between said first clamping surface and a second opposing clamping surface carried by the frame, and a link directly pivotally linking the first axis of the reel to a further axis of the clamping member at a point which is nearer to said first surface than is the third axis whereby movement of the reel about said second axis during pay-out of the belt results in angular movement of the clamping member about the third axis moving said clamping surface into engagement with the belt to effect clamping thereof between said surfaces.

In the case of this automatic safety-belt reeling device, during the lifting movement of the clamping member exact parallel guidance of the reel axis with regard to its swivel axis is ensured together with rigid parallel actuation of the clamping member when actuated.

Guiding of the third axis of the clamping member can be effected by arcuate guide slots in the side parts of the frame or by providing a separate supporting spindle for the clamping member.

The necessary movement of the reel axis can preferably be effected by way of two parallel links, mounted on the reel axis, and on the two bearing pivots to which the clamping member is rotatably located and defining a fourth axis.

Figure 2:
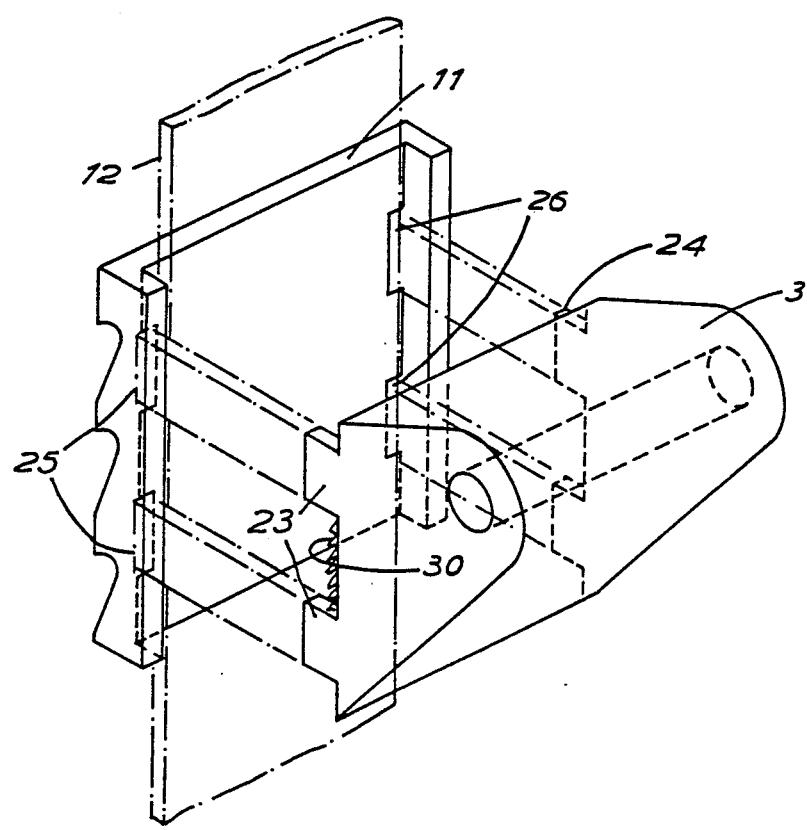
Figure 3:
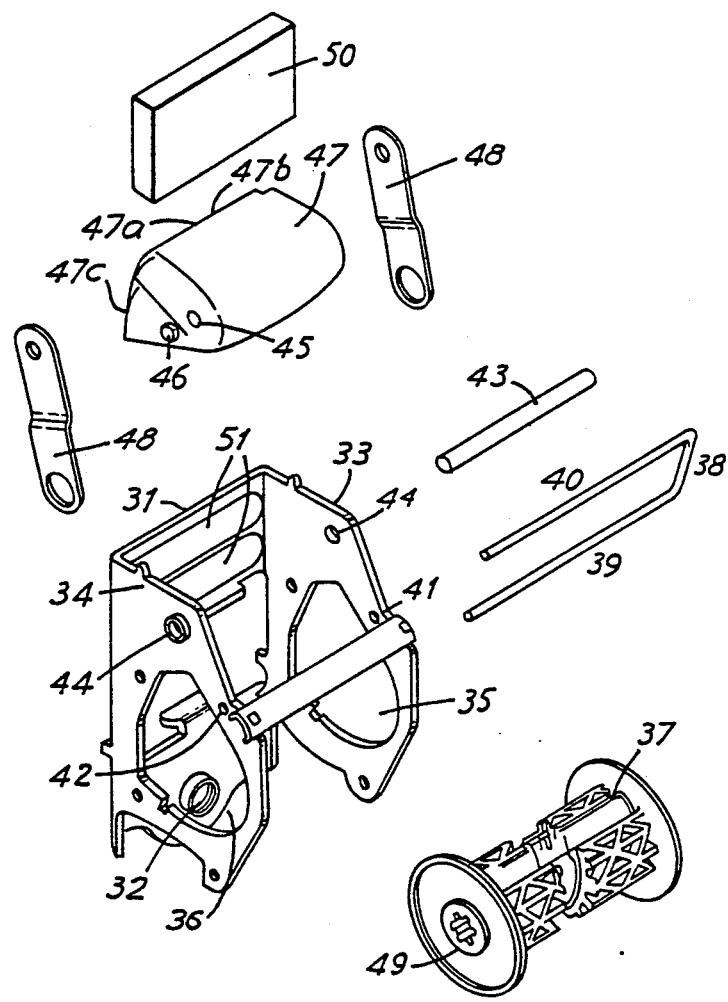

In order that the invention may be more clearly understood and readily carried into effect the same will be further described with reference to the accompanying drawings of which FIG. 1 shows by way of example a side view of one embodiment of the invention, FIG. 2 shows a further development of the exemplified embodiment, shown in FIG. 1, in perspective representation, FIG. 3 shows the components of a further preferred embodiment and FIGS. 4–7 illustrate various stages in the operation of the embodiment of FIG. 3.

The safety belt reeling mechanism of FIG. 1 shows a reel 9 to pay out and reel in a safety belt 12 under tension of a clock spring (not shown). The safety belt 12 is wound onto reel 9 in known manner and the reel is rotatable about a first axis 8. The reel has flanges 16 and 17 at respective ends and is arranged in a frame having a back and parallel sides 1 and 2 and which is fastenable to a vehicle chassis or door pillar. The mechanism also has a sensor mechanism, FIGS. 4–7, which responds to the vehicle rate of change of speed or belt rate of change of speed to initiate a lock up action.

Mounted between the frame sides but separately to the belt reel 9 is a clamping mechanism which has a clamping jaw 3 with coaxial bearings 4, 5 at respective ends formed by protruding ends of a bearing pin 13 which is inserted into a bore of the clamping jaw 3. The clamping jaw 3 is mounted so as to be freely swingable on the bearing pin 13, the protruding ends, forming the bearings 4, 5, being guided in clamping-jaw guides in the form of arcuate slots 6 and 7 in the frame sides 1, 2. These slots curve circularly about an axis 27 as shown which lies outside the frame limbs 1 and 2 but alternative curve shapes may be chosen if desired for such slots.

The clamping jaw 3 has teeth 30 on its clamping surface arranged in rows which extend across the direction of movement of the safety belt 12, on the clamping surface of the clamping jaw 3. The design of these teeth 30 is chosen to suit the weave and material of the safety belt 12, so that they can suitably lock into one side of the fabric.

On the other side of the safety belt 12 is a member 11 which is mounted on the central or back part 19 of the frame. Integrally formed into the back part 19 of the frame are ascending wedge surfaces 20, 21 and 22 against which the counter-clamping bearing 11 butts. The angle at which these wedge surfaces form with the direction of movement of the safety belt 12 is preferably between 2° up to 10°.

The first winding axis 8 of reel 9 is mounted to be able to swing about a parallel second axis 10 on two levers 28, 29, of identical length, the axis 10 being fixed on the two frame limbs 1 and 2. This second axis 10, the first axis 8 and the axis of the bearing pin 13 are held all parallel to one another. The axis 8 and the two levers 28 and 29 as well as the swivel axis 10 can be provided as described in greater detail in the Specification of European Patent Application Number 88302921.7. The reel axis 8 and the swivel axis as well as one of the two levers 28 and 29 can be formed by a U-shaped bearing needle member and the other of the two levers 28 and 29 is provided by appropriate design of a multi-function deceleration sensing assembly. The two levers 28 and 29 are designed to be of identical length, so that an exact simultaneous and parallel guidance of the winding axis 8 about the swivel axis 10 upon a lifting movement, to be described in more detail below, into a locking position is ensured.

As shown by FIG. 1, the first axis 8 is connected by way of a lifting linkage in the form of two parallel link member 14 and 15 to the protruding ends of the bearing pin 13 to form the bearings 4 and 5 of the clamping jaw 3 on the frame limbs 1 and 2. Moreover, the clamping jaw possesses supporting feet 31 and 32 which are supported, at least during lift movement, into the clamping position, against the end flanges 16 and 17 of the winding reel. In this way control of engagement of the teeth 30 with the belt can be achieved. The teeth lying furthest from reel can thereby be arranged first to engage the safety belt during locking operation. The control may however, be arranged if desired that the rows of teeth lying nearest to the reel are the first to enter into engagement with the safety belt 12.

Referring now to FIG. 2, guide projections 23, 24 can be provided if required on the jaw 3 which protrude on each side of the belt 12 in the exemplified embodiment shown, into aligning apertures 25 and 26 of the counterclamping bearing plate 11.

In operation of the device shown in FIG. 1 the counter-clamping plate 11 forms a fixed smooth guide surface for the safety belt 12. During free running action of the reel 9, the reel runs freely about its axis relative to levers 28 and 29. In the event of response of the sensor mechanism, to an accelerated belt-strap extraction movement or to abrupt vehicle deceleration, the reel 9 is locked to the levers 28 and 29 by the action of the mechanism and the winding axis 8 of the winding shaft of the belt reeling mechanism 9 is therefore swivelled about the second axis 10, by the force of the belt 12 pay-out of which is abruptly interrupted. This swivel movement is indicated by arrow A and results in the spindle 13 carrying jaw 3 in a direction defined by guide slots 6 and 7 by virtue of link member 14 and 15.

The clamping surface of the clamping jaw 3 with the teeth 30 therefore approaches the counter-clamping bearing 11 and brings the teeth firmly into engagement with the belt-strap part 18, lying between the counter-bearing 11 and the clamping jaws 3.

In this way the run of the belt from the frame is halted and payout of belt 12 from the locked winding shaft, (on which the belt can be wound relatively loosely), is prevented.

Referring now to the preferred embodiment of the invention as shown in FIGS. 3–7, the automatic safety belt reeling device comprises a main frame having a back portion 31 provided with a substantial fixing boss 32 for fixing the frame to the door pillar of a vehicle body. The frame has two side parts denoted by references 33 and 34 provided with large apertures 35 and 36 for accommodating the ends of a safety belt reel 37. The safety belt reel 37 is located on splines carried by a multi-function sensing device which is seen in the side views of FIGS. 4–7. The reel 37 and the multi-function sensing device are carried on a U-shaped supporting pivot needle denoted by reference 38. The limb 39 of the needle provides a pivot for rotation of the central splines of the multi-function sensing device and the limb 40 provides for pivotting of the multi-function sensing device and the reel 37. Thus the limb 39 defines a first axis of rotation of the reel and the limb 40 defines a second axis about which the reel axis 39 is able to angularly move whilst remaining parellel to 40. Thus in the assembled device, the limb 40 of the U-shaped member 38 is rotatable carried in apertures 41 and 42 of the side parts of the frame. Carried on a further spindle denoted by reference 43 carried in apertures 44 and 45 of the frame, there is a clamping member 47 which has a through-bore 45 to receive spindle 43. The clamping member 47 is also provided with apertures such as 46 on each side which are located nearer a clamping surface 47a of the clamping member than the aperture 45 about which the clamping member rotates. The apertures 46 provide for location of upper pivotal ends of respective links 48, the lower ends of which are rotatably carried on respective spigots such as respective concentric spigot 49 on each end of the belt reel 37.

The surface 47a of the clamping member 47 is provided with moulded-in serrations which extend along the surface thereof transverse to the direction of pay-out of the seat belt as seen in FIGS. 4–7 and fixed within the back part 31 of the frame there is a moulded clamping plate denoted by reference 50 in FIG. 3. This clamping plate is provided with moulded-in recesses to receive two inwardly projecting ridges 51 as seen in the back part of the frame thereby acting to positively locate the clamping plate 15 against movement in the direction of travel of the seat belt.

Figure 4:
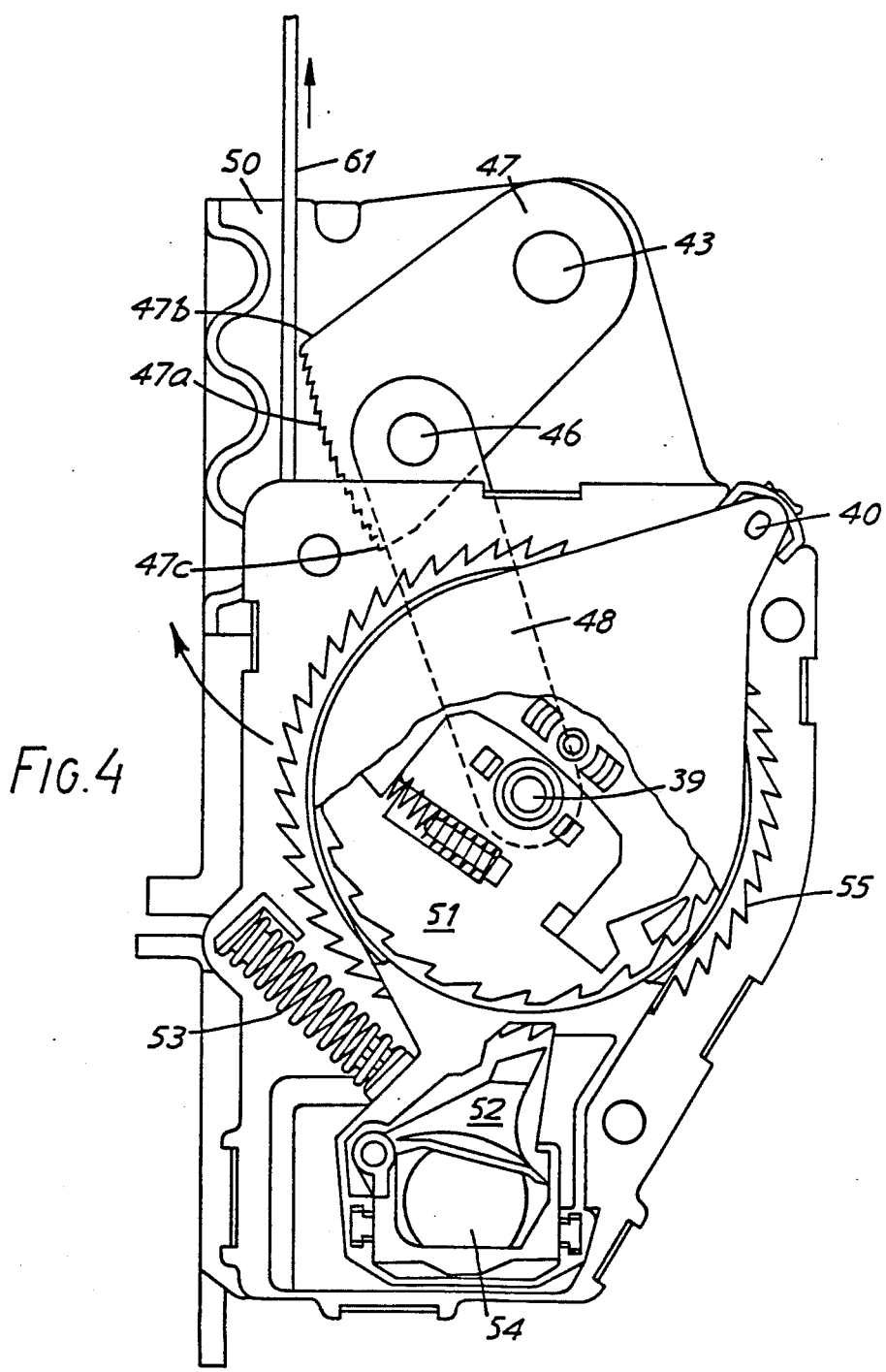

Referring to FIG. 4, a side view of the assembled belt reeling device is shown with the outer cover of the multi-function sensing device partially cut away to reveal the interior of the cam-operated belt acceleration sensing device denoted generally by reference 51 and also the device denoted generally by reference 52 which senses excessive deceleration of a vehicle on which the reeling device is carried, in any direction. As seen, the latter comprises a pawl which is displaceable by an inertial mass comprising a ball 54.

The assembly of the multi-function sensing device is held in its unoperated condition by a spring denoted by reference 53 one end of which bears against the housing of the multi-function sensing device and the other end of which is located in a fixed position to the frame.

The multi-function sensing device is substantially as described in the Specification of European Patent Application 88302921.7 which describes the use of a U-shaped support needle member such as 38. Further details of deceleration and or belt acceleration sensing means are given in the Specification of European Patent Application Number 83302158.7 and U.K. Patent Application Number 8628148. In each case, the mechanism is designed to effect lock-up of the belt reel in an emergency condition.

It will be appreciated that in the present instance, lock-up of the belt reel 37 is effected by the multi-function sensing device whereby the sensing device and the belt reel are locked together to cause the axis of the belt reel defined by the limb 39 of the U-shaped support member to rotate about the second axis defined by the limb 40. Such movement is thus transmitted via the respective links 48 to the pivot point 46 of the clamping member 47 whereby the curved clamping face 47a of the clamping member 47 is rotated about the pivot axis defined by the pin 43 and the clamping face moves towards the seat belt 61 thereby clamping it against the inner surface of the clamping plate 50. After initial engagement of the first few teeth or serrations of the curved clamping surface 47a with the paying-out seat belt 61, the clamping force acting to lock the seat belt 61 between the clamping surface 47a and the clamping plate 50 is generated substantially entirely by the action of the belt 61 itself and the reaction exerted by the spindle 43. Typically, the clamping force exerted between the clamping surface 47a and the belt 61 is equivalent to 2 or 2.5 times the tension in the belt 61 itself.

Referring now more particularly to the operation of the device as illustrated in FIGS. 4, 5, 6 and 7, FIG. 4 shows the normal free-running operation position of the total assembly at which position the belt 61 is free to move inwardly or outwardly of the assembly. During withdrawal, of the belt 61 the reel 37 pays out the belt and at the same time winds up a clock spring not shown the force of which then acts to recoil the belt presenting a comfortable tension thereon against the occupant of the seat in conjunction with which the belt is used.

Figure 5:
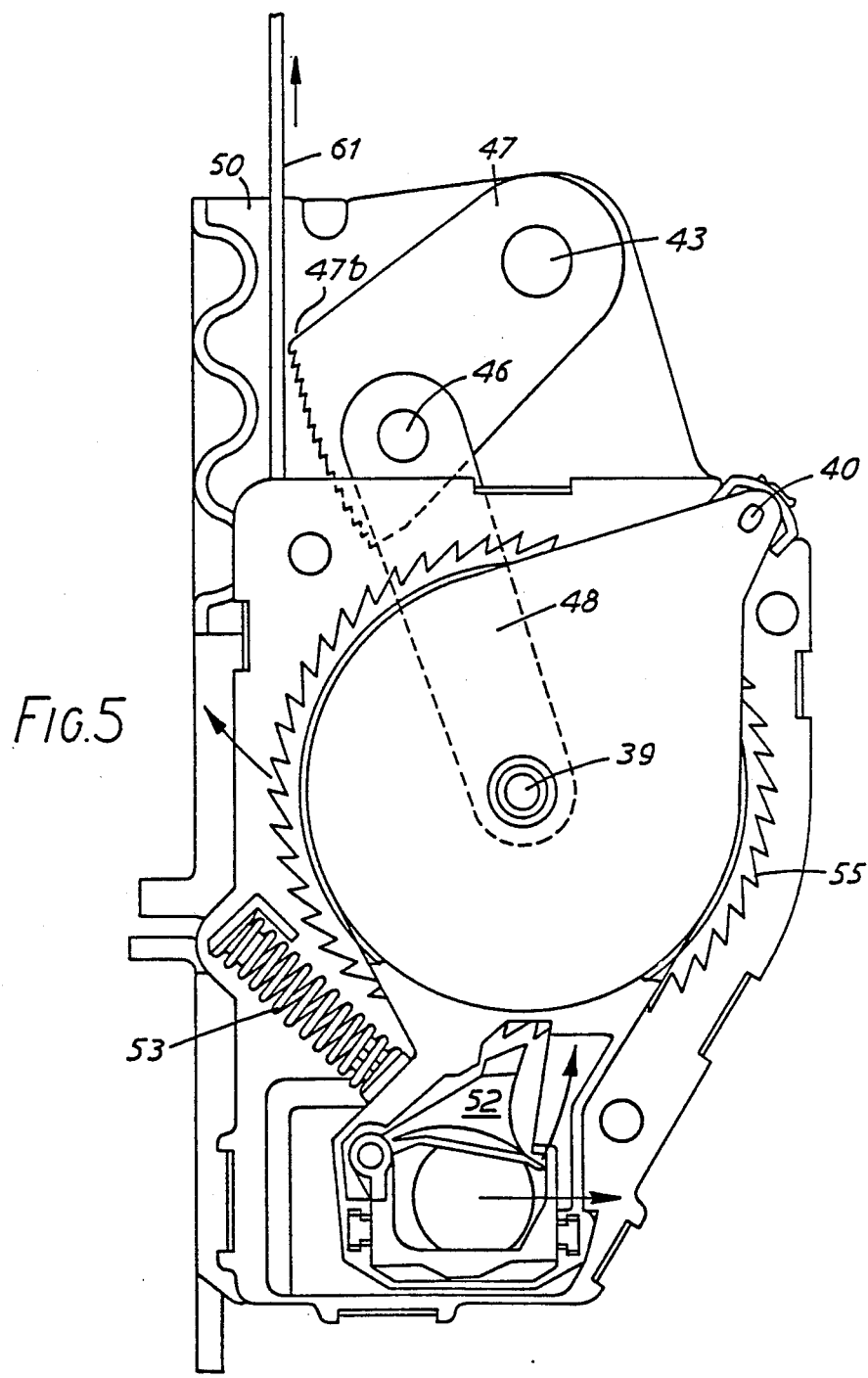

Referring now to FIG. 5, it is assumed here that the vehicle is subject to an excessive deceleration and the effect of this is to cause movement of the ball 53 thereby commencing to lift the pawl of the multi-function sensing mechanism into engagement with the outer toothed periphery of the ratchet toothed wheel 55 which rotates with the reel in relation to the remainder of the mechanism. The mechanism is thereby locked up to cause rotation of the reel axis 39 in relation to the second axis 40 and assuming that there is substantial tension on the belt 61 at this time, the belt reeling device moves into a condition indicated by FIG. 7 wherein it is seen that a substantial proportion of the curved clamping surface 47a of the clamping member 47 is in engagement with the belt 61 having rotated about the spindle 43 after being picked up by the belt.

Figure 6:
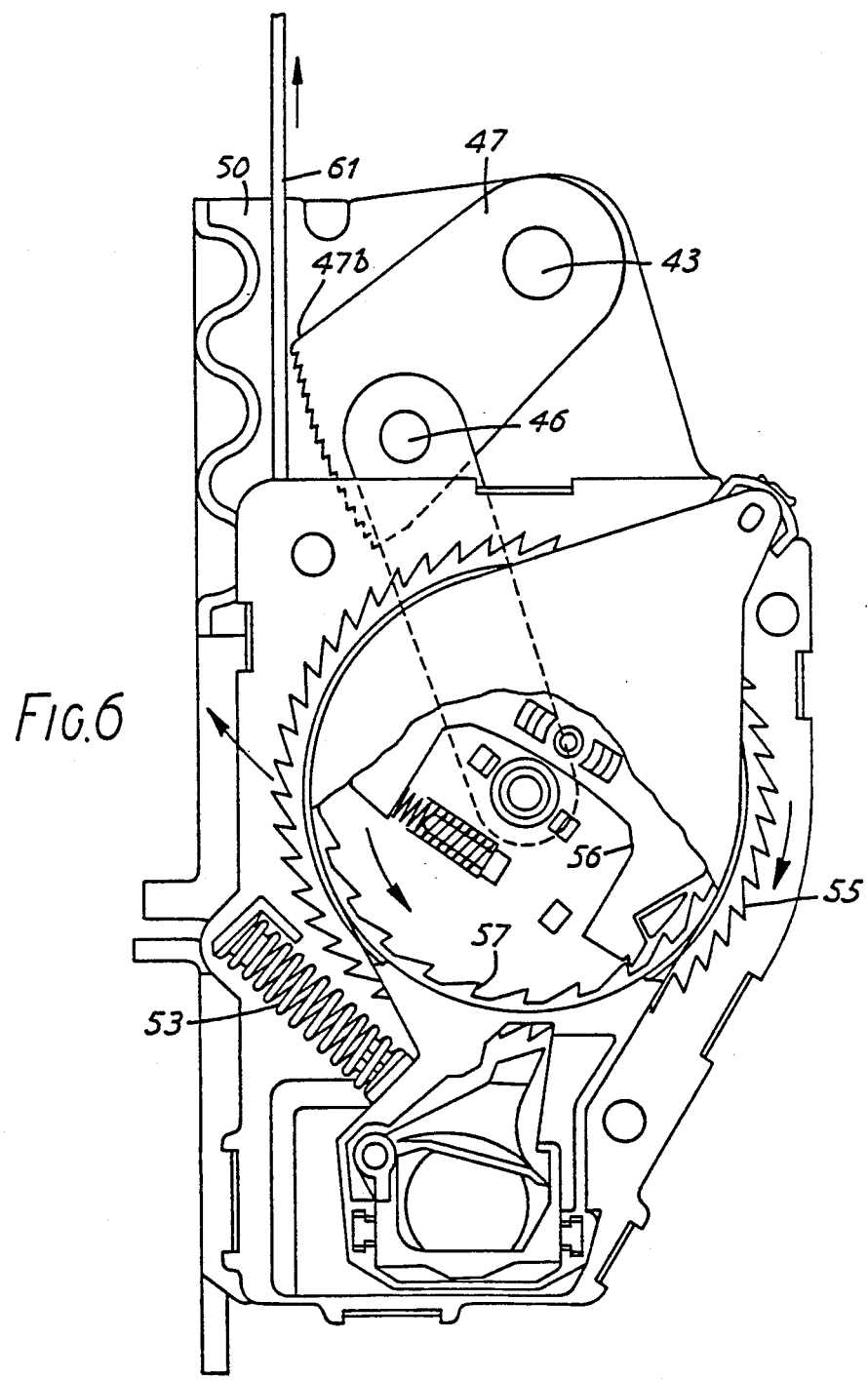

A similar effect will result as indicated in FIG. 6. The inertial member 56 which is responsible to excessive reel-out speed change, is moved into engagement with the inner teeth 57 of the toothed wheel, which again causes the multi-function assembly to be locked from the point of view of rotation, to the reel 37 and the result is the same as shown in FIG. 7 referred to above.

In each case, when the locking tension is released from the belt the spring 53 and the clock spring of the reel acts to urge the reel and the multifunction arrangement about axes 39 and 40 respectively to enable the clamping member to be returned to its initial condition as shown in FIG. 4.

We claim:

1. An automatic safety belt reeling device having a frame with a back and two side parts within which a belt reel is carried rotatable about a first axis of rotation and being effective to permit pay-out or reel-in of the belt, a multi-function sensor mechanism operable to effect blocking of the reel rotation during pay-out from said reel between said side parts of said frame, said first axis being displaceable about a second axis parallel thereto to initiate locking of the belt characterised in that for said locking of the belt there is provided a moveable belt clamping member guided for movement in the frame about a third axis parallel to the first axis, said clamping member having a first clamping surface and said belt passing between said first clamping surface and a second opposing clamping surface carried by the frame and a link directly pivotally linking the first axis of the reel to a further axis of the clamping member at a point which is nearer to said first surface than is the third axis whereby movement of the reel about said second axis during pay out of the belt results in angular movement of the clamping member about the third axis moving said clamping surface into engagement with the belt to effect clamping thereof between said surfaces.

2. An automatic safety belt reeling device as claimed in claim 1 characterized in that said first surface is a convex cylindrical surface.

3. An automatic safety belt reeling device as claimed in any preceeding claim characterized in that said first axis and said second axis are defined relative to each other by a generally U-shaped bearing member with two parallel limbs along which said first and second axes respectively lie.

4. An automatic safety belt reeling device as claimed in claim 1 characterised in that said first clamping surface having a forward edge and a trailing edge in the direction of angular movement towards said engagement with the belt and said forward edge engaging the belt in advance of the remainder of the surface.

5. An automatic safety belt reeling device as claimed in claim 1 characterized in that said second clamping surface comprises a surface of a clamping plate attached to the back of said frame between said side parts.

6. An automatic safety belt reeling device as claimed in claim 1 characterised in that said clamping member is a one-piece clamping member having a bore therethrough which with corresponding bores in the side parts of said frame accommodates a pivot spindle.

7. An automatic safety belt reeling device as claimed in claim 6 characterised in that said spindle lies along said third axis.

8. An automatic safety belt reeling device as claimed in claim 6 characterised in that said spindle is guided in arcuate guide slots in the side parts of the frame to define a third axis of said angular movement which lies outside said frame.

* * * * *